(No Model.) 2 Sheets—Sheet 1.

J. M. WOODWARD.
COMBINED PLANTER AND FERTILIZER DISTRIBUTER.

No. 355,630. Patented Jan. 4, 1887.

Witnesses  Inventor
  John M. Woodward
  By his Attorney (No Model.) 2 Sheets—Sheet 2.
J. M. WOODWARD.
COMBINED PLANTER AND FERTILIZER DISTRIBUTER.
No. 355,630. Patented Jan. 4, 1887.
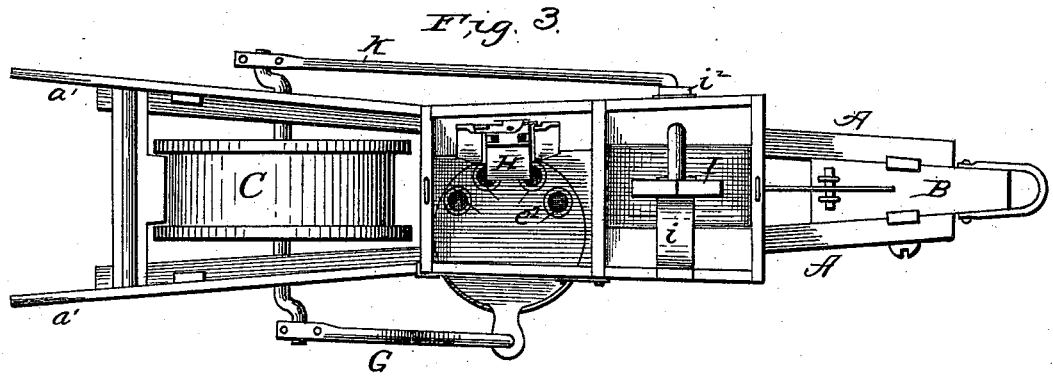
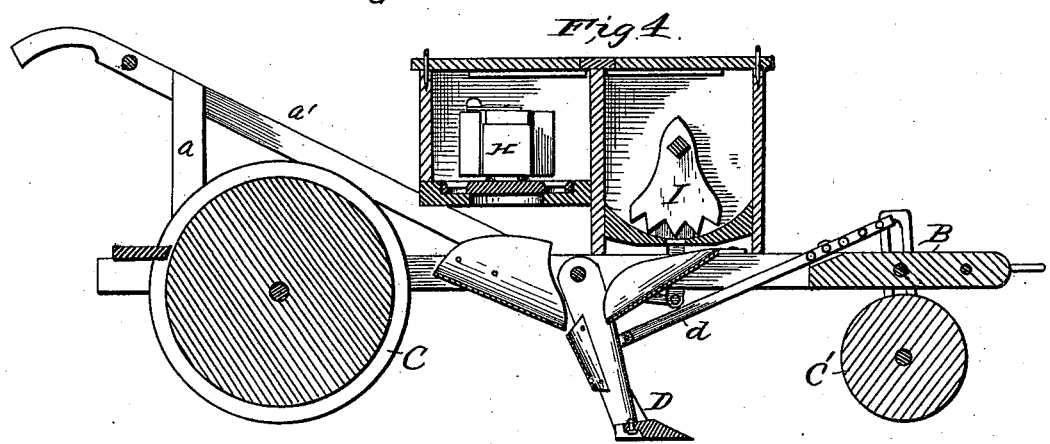
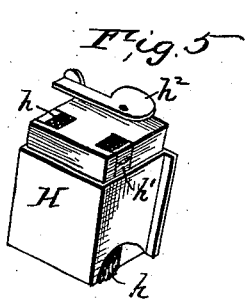
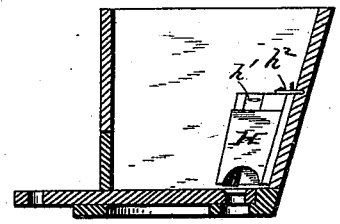
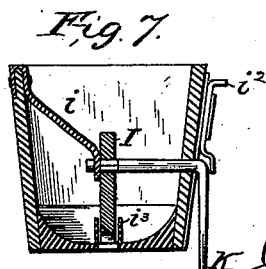
Witnesses
Inventor
John M. Woodward
By his Attorney
V. D. Stockbridge

UNITED STATES PATENT OFFICE.

JOHN MENDENHALL WOODWARD, OF ROMANSVILLE, PENNSYLVANIA.

COMBINED PLANTER AND FERTILIZER-DISTRIBUTER.

SPECIFICATION forming part of Letters Patent No. 355,630, dated January 4, 1887.

Application filed August 23, 1886. Serial No. 211,672. (No model.)

*To all whom it may concern:*

Be it known that I, JOHN MENDENHALL WOODWARD, a citizen of the United States, residing at Romansville, in the county of Chester and State of Pennsylvania, have invented certain new and useful Improvements in a Combined Planter and Fertilizer-Distributer; and I do hereby declare the following to be a full, clear, and exact description of the invention, such as will enable others skilled in the art to which it appertains to make and use the same.

My invention relates to improvements in combined planters and fertilizer-distributers; and it consists in the construction, combination, and arrangement of devices, as will be more fully hereinafter described, and set forth in the claims.

Figure 1:
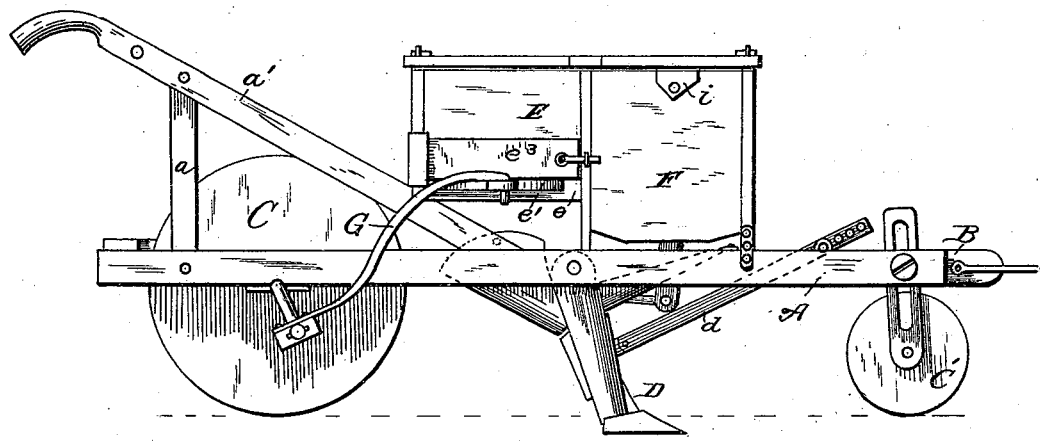
Figure 2:
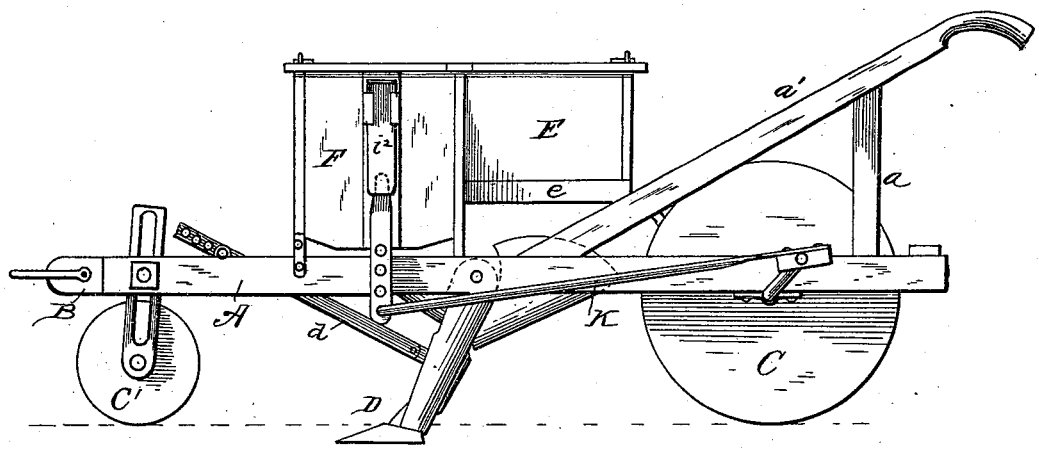

In the drawings forming a part of this specification, Figures 1 and 2 are right and left side elevations of my invention. Fig. 3 is a top plan of the same. Fig. 4 is a longitudinal vertical section. Fig. 5 is a perspective showing the brush holder or block and the means for adjusting it. Fig. 6 is a vertical cross-section through the grain hopper, showing the brush-block in elevation. Fig. 7 is a similar section of the fertilizer-hopper, showing the feeder and its support in elevation.

The frame of my machine is made up of side rails or beams, A A, short clevis-beam B, uprights $a\ a$, and handles $a'\ a'$. This frame is mounted on the driving and covering wheel C and the vertically-adjustable carrying-roller C'.

The plow or furrowing device D is pivotally attached to the frame by means of a bolt or rod extending through the sides of the frame, and is thereby adjustable to any desired angle. The shank of the plow D is hollow for the passage of the grain and the fertilizer to the furrow, in which it is covered by the square flanged driving-wheel C.

A draft rod or plate, $d$, provided with a series of holes, is attached to the shank of the plow, passes along a slot in the clevis-beam, and is secured by a wooden pin to said beam. By reason of the perforated rod $d$ the plow may be regulated to any desired angle with the frame, and by the use of a wooden coupling-pin the machine will not be injured upon contact with stones, roots, or other obstructions, as the pin gives way before the parts of the machine break. The plow-point is shaped to fit over and embrace the shank or plow D, so as to prevent wearing and other injury. The point is secured to the shank by a bolt, or otherwise, as may be most convenient.

Mounted on the frame are the hoppers E and F, for grain and fertilizer respectively. These hoppers or boxes, while built together, are entirely independent of each other, and have independently-driven feed mechanisms. The corn or grain hopper E is provided with a metal bottom or rim, $e$, to which is fitted a circular corn or grain plate, $e'$. The grain-plate is provided with a radial arm or stem, with which the operating-pitman G is connected, and it is also provided with countersunk holes or grain-cups, as shown at $e^2$. The cups are countersunk, so as to permit the grain to enter them freely and pass under the brushes and brush-block without being crowded or broken, as is frequently the case.

I usually provide for each machine four interchangeable grain-plates, each having a different number or arrangement of cups or holes. For corn-planting I ordinarily use a plate with four cups or holes, as shown in the drawings.

The driving-wheel shaft is provided with cranks at its extremities. One of these cranks drives the pitman G and operates the feed or grain plate $e'$. The pitman usually rotates or oscillates the grain-plate about four-tenths of the circumference of the plate.

For convenience of insertion, removal, or substitution of the grain-plate, I provide the grain-hopper with a removable door, $e^3$, as shown in Fig. 1.

The pitman G is bent as shown, so that its backward draft in oscillating the grain-plate will not cause it to jam and produce undue friction.

H is a piece which I call the "brush-block." This block is bound with metal and has flanges which work in ways provided for it inside the grain-hopper. It is arranged so as to bring the brushes over the grain cups or holes as the plate vibrates back and forth. The block is also provided with sockets for the brushes $h\ h$, and with wedges $h'\ h'$ for compressing and holding the brushes at the point desired. By loosening the wedges the brushes may be raised or lowered to compensate for wear, as well as to regulate the pressure over the grain-cups in the vibrating plate. The block H is secured in place by a cam-latch or eccentric lever, $h^2$. The grain enters the cups alternately, as they extend beyond the brushes, and is discharged between the brushes. The reciprocating or oscillating motion of the grain-plate wears the brushes evenly in both directions, and thus preserves the brush in good condition until worn out, as well as prevents crowding or jamming of the grain as it passes underneath them.

The phosphate or fertilizer hopper F is arranged on the frame in front of the grain-hopper, and is provided with a curved or funnel-shaped bottom, having a central exit leading to a spout emptying into the hollow plow-shank.

I is a segmental-shaped fertilizer-feeder. It is of suitable thickness and is provided with notches, as shown, on its convex edge, and by its vibration above the central exit the fertilizer is regularly fed and delivered in the drill or the furrow. This segmental feeder is mounted on a shaft supported in a bracket, $i$, and one side of the hopper. The shaft is provided with a depending arm having a number of holes for the attachment of pitman K. By means of the plurality of holes the feed may be regulated as required.

The shaft carrying the feeder is held endwise in its place by a latch or slide, $i^2$, and by raising said latch the attachments are readily removable for cleaning purposes, which is especially necessary when using phosphate, which soon gums and clogs machines in which it is used.

To furnish a clean cut-off for the feeder, I provide sharp flanges or plates $i^3$ $i^3$, between which the notched feeder swings and carries an exact amount of material.

The phosphate and corn spouts are large, as shown, to avoid any possibility of clogging. As the grain falls on the pan or spout it makes a clicking sound, and serves to indicate that the machine is working properly. Moreover, the feed of the grain and fertilizer can be readily seen by the operator.

The driving-wheel has a square-faced groove and double square-faced flanges, which compress the earth evenly and prevent the machine from sliding sidewise when used on rough or stony ground or on a side-hill.

When it is desired to use the corn-planter alone, the pitman-connection with the fertilizer-feeder may be removed, and thus leave the fertilizing device disengaged.

It will be observed that the machine is easy to manage, its distribution of both grain and fertilizer regular and positive, is simple and cheap and not likely to get out of order, and is therefore durable.

Having described my invention, I claim—

1. The combination of a hopper having a curved bottom and side guards for the delivery-orifice, and a vibrating segmental notched fertilizer-feeder, as described.

2. The combination of the vibrating notched feeder and cut-off flanges, as $i^3$, as described.

3. The combination of a hopper, a vibrating notched fertilizer-feeder, a removable shaft or support therefor, and a slide or latch for locking said shaft in place, as described.

4. The combination, with a grain-planter provided with grain-cups and a brush on opposite sides of the delivery-orifice, of a fertilizer-distributer having concaved hopper, segmental notched feeder, and side guards, as described.

5. The combination of a fertilizer-distributer having a notched segmental feeder, a hopper, side guards for the feeder, and adjustable means for operating the feeder, whereby a predetermined quantity of fertilizing material may be distributed, and a planter of the character described having vibrating grain-plates with grain-cups, as specified.

In testimony whereof I affix my signature in presence of two witnesses.

JOHN MENDENHALL WOODWARD.

Witnesses:
JOSEPH L. HIDDLESON,
MILTON H. HIDDLESON.